United States Patent
Nishikawa

(10) Patent No.: US 9,855,714 B2
(45) Date of Patent: Jan. 2, 2018

(54) STRIP RUBBER ADHERING METHOD AND STRIP RUBBER ADHERING APPARATUS

(71) Applicant: TOYO TIRE & RUBBER CO., LTD., Osaka-shi, Osaka (JP)

(72) Inventor: Syuuichi Nishikawa, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 187 days.

(21) Appl. No.: 14/496,696

(22) Filed: Sep. 25, 2014

(65) Prior Publication Data

US 2015/0136309 A1   May 21, 2015

(30) Foreign Application Priority Data

Nov. 21, 2013 (JP) ................................ 2013-240942

(51) Int. Cl.
*B29D 30/28* (2006.01)
*B29D 30/30* (2006.01)
(Continued)

(52) U.S. Cl.
CPC ..... *B29D 30/1621* (2013.01); *B29D 30/0061* (2013.01); *B29D 30/1628* (2013.01);
(Continued)

(58) Field of Classification Search
CPC ................ B29D 30/14; B29D 30/1621; B29D 30/1628; B29D 30/28; B29D 30/3021; B29D 30/3028; B29D 30/60
See application file for complete search history.

(56) References Cited

U.S. PATENT DOCUMENTS 4,130,453 A * 12/1978 Hollister ............... B29C 63/105
156/187
4,231,164 A * 11/1980 Barbee ................. G03D 15/022
118/68
(Continued)

FOREIGN PATENT DOCUMENTS

CN         102555693 A      7/2012
JP       2003-340935      * 12/2003  ............. B29D 30/30
(Continued)

OTHER PUBLICATIONS

Machine generated English language translation of JP 2003-340935 (original document dated Dec. 2003).*
(Continued)

*Primary Examiner* — Martin Rogers
(74) *Attorney, Agent, or Firm* — Westerman, Hattori, Daniels & Adrian

(57) ABSTRACT

A strip rubber adhering method includes: extruding strip rubber of a shape having an apex portion in cross section from an extruder and moving the same forward toward a drum; pressing a surface of the strip rubber on the apex portion side by a pressure bonding roller, adhering the strip rubber to the drum, moving relatively the drum and the extruder with respect to each other in an axial direction of the drum, and winding the strip rubber around the drum in a spiral manner; and exposing the surface of the strip rubber on the apex portion side to wind from a blowing apparatus in the vicinity of a position of adhesion of the strip rubber to the drum and cooling the surface of the strip rubber on the apex portion side.

2 Claims, 6 Drawing Sheets

(51) Int. Cl.
  *B29D 30/16* (2006.01)
  *B29D 30/00* (2006.01)
  *B29K 21/00* (2006.01)

(52) U.S. Cl.
  CPC .. *B29D 30/3028* (2013.01); *B29D 2030/1678* (2013.01); *B29K 2021/00* (2013.01)

(56) References Cited

U.S. PATENT DOCUMENTS

| | | | | |
|---|---|---|---|---|
| 5,091,134 | A * | 2/1992 | Oshima | B29C 35/16 264/176.1 |
| 6,238,627 | B1 * | 5/2001 | McGowan | B01J 19/0046 422/129 |
| 6,554,041 | B1 * | 4/2003 | Ohki | B29D 30/60 156/397 |
| 2005/0034802 | A1 * | 2/2005 | Shirasaka | B29C 47/0047 152/564 |
| 2008/0093011 | A1 * | 4/2008 | Ogawa | B29D 30/60 156/117 |
| 2009/0188607 | A1 * | 7/2009 | Tatara | B29D 30/28 156/117 |
| 2012/0152419 | A1 | 6/2012 | Deguchi | |
| 2013/0340903 | A1 | 12/2013 | Deguchi | |

FOREIGN PATENT DOCUMENTS

| | | | |
|---|---|---|---|
| JP | 2003-340935 A | 12/2003 | |
| JP | 2004-74730 | * 3/2004 | ............ B29D 30/30 |
| JP | 2005-349587 A | 12/2005 | |
| JP | 2006-130757 | * 5/2006 | |
| JP | 2006-130757 A | 5/2006 | |

OTHER PUBLICATIONS

Machine generated English language translation of JP 2004-74730 (original document dated Mar. 2004).*
Machine generated English language translation of JP 2006-130757 (original document dated May 2006).*
Office Action dated Dec. 22, 2016, issued in counterpart Chinese Application No. 2014103528423, with partial English translation. (24 pages).
Office Action dated Jun. 23, 2016, issued in counterpart Chinese Patent Application No. 201410352842.3, with English translation. (16 pages).
Office Action dated Apr. 10, 2017, issued in counterpart Chinese Application No. 201410352842.3, with partial English translation. (29 pages).

* cited by examiner

STRIP RUBBER ADHERING METHOD AND STRIP RUBBER ADHERING APPARATUS

REFERENCE OF RELATED APPLICATION

This application enjoys priority benefit from this application on the basis of Japanese Patent Application No. 2013-240942.

BACKGROUND OF THE INVENTION

Field of the Invention

The present invention relates to a strip rubber adhering method and a strip rubber adhering apparatus.

Background Art

A method of molding a tire component by winding a strip rubber on a rotating drum is proposed (JP-A-2003-340935, JP-A-2006-130757, and JP-A-2005-349587).

However, there may arise a problem if a strip rubber is extruded from an extruder and then is adhered to a drum or to a strip rubber adhered to the drum on ahead when it is still at a high temperature. Specifically, the strip rubber at a high temperature is adhered to the drum or the strip rubber adhered to the drum on ahead, then is cooled gradually, and is shrunk accordingly. Consequently, a gap is formed between a shrunk portion of the strip rubber and another part of the strip rubber adjacent thereto. As a result, air remains in the interior of a completed tire component.

Therefore, cooling the strip rubber before being adhered to the drum is conceivable. However, when the strip rubber is completely cooled as a whole, adhesiveness of the strip rubber is lowered. In such a case, the strip rubber can hardly be adhered tightly to a drum surface or a strip rubber adhered to the drum on ahead. Consequently, a gap is formed, for example, between strip rubbers. As a result, air remains in the interior of a completed tire component.

SUMMARY OF THE INVENTION

An object to be solved by the invention is to provide a strip rubber adhering method and an adhering apparatus which make air difficult to remain in the interior of a tire component to be completed.

A strip rubber adhering method of the embodiment includes: extruding strip rubber of a shape having an apex portion in cross section from an extruder and moving the strip rubber forward toward a rotating drum; pressing a surface of the strip rubber on the apex portion side toward the drum by a rotatable pressure bonding roller, adhering a surface of the strip rubber on the opposite side from the apex portion side to the drum, moving relatively the drum and the extruder with respect to each other in an axial direction of the drum, and adhering the strip rubber to the drum while winding the strip rubber in a spiral manner; and exposing the surface of the strip rubber on the apex portion side to wind supplied from a blowing apparatus in the vicinity of a position of adhesion of the strip rubber to the drum and cooling the surface of the strip rubber on the apex portion side.

According to a strip rubber adhering method of the embodiment, air can hardly remain in the interior of the completed tire component.

DETAILED DESCRIPTION OF THE INVENTION

An embodiment of the invention will be described with reference to the drawings.

(1) Strip Rubber Adhering Apparatus 1

Figure 1:
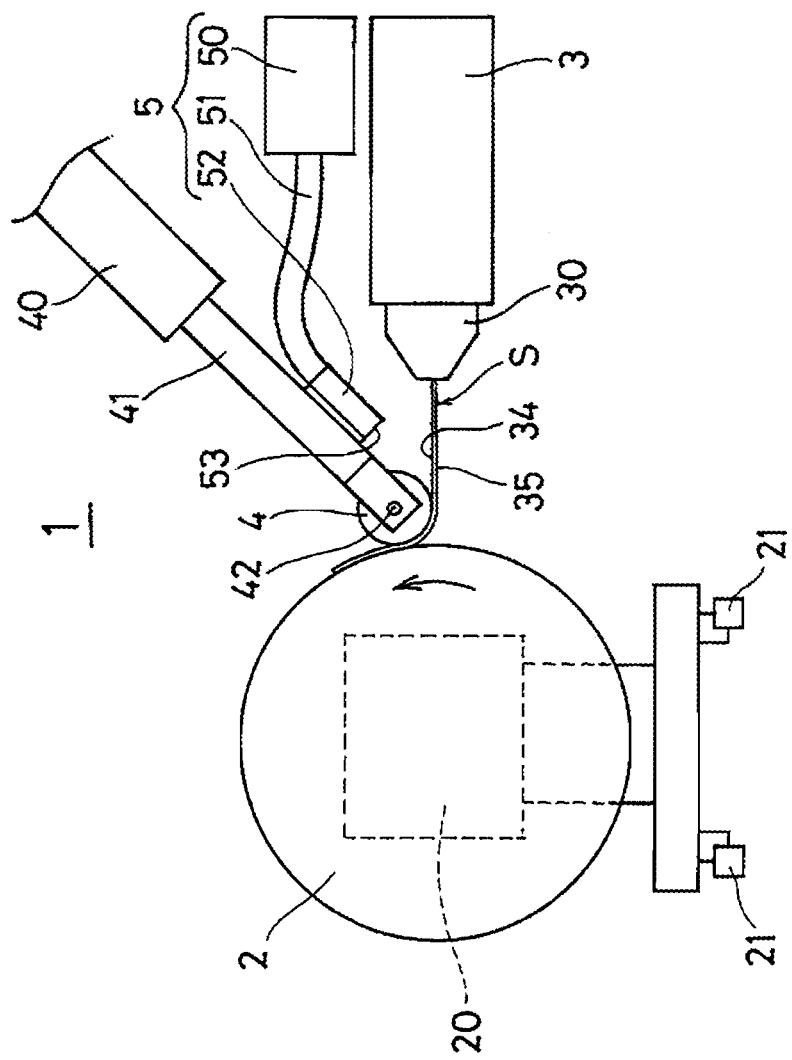
FIG. 1 is a front view of a strip rubber adhering apparatus 1.

The strip rubber adhering apparatus 1 of the embodiment will be illustrated in FIG. 1. The strip rubber adhering apparatus 1 includes a rotatable drum 2, an extruder 3 configured to extrude strip rubber S toward the drum 2, a pressure bonding roller 4 configured to hold the strip rubber S against the drum 2 and adhere the same to the drum 2, and a blowing apparatus 5 configured to blow air toward the strip rubber S.

The strip rubber S has an elongated member formed of rubber.

The drum 2 has a known structure. The drum 2 rotates upward from below when viewed from the extruder 3 side. The drum 2 is held by a drum holding apparatus 20. A rail 21 extending in an axial direction of the drum 2 is provided below the drum holding apparatus 20. The drum holding apparatus 20 is allowed to move in the direction of an axis of the drum by moving on the rail 21.

The extruder 3 has a known structure. The extruder 3 is provided so that the direction of extrusion of the strip rubber S extends in the horizontal direction. A cap 30 of the extruder 3 is formed with a hole 31 configured to extrude the strip rubber S.

Figure 2:
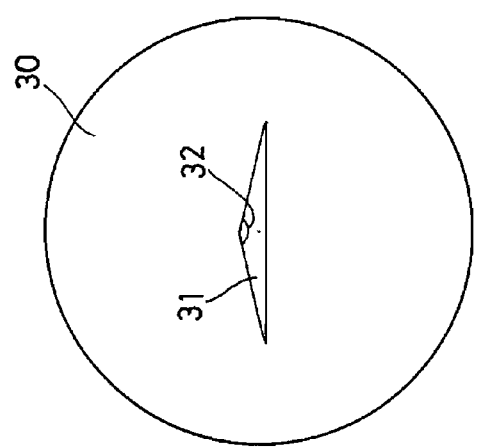
FIG. 2A is a cross-sectional view of a cap 30.
FIG. 2B is a cross-sectional view of a strip rubber S extruded through a hole 31.
FIG. 2C is a perspective view of the strip rubber S.
Figure 2:
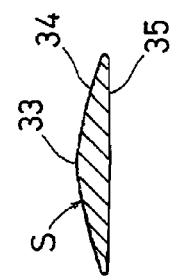
Figure 2:
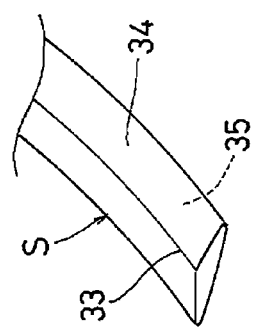

An example of a cross-sectional shape of the hole 31 will be illustrated in FIG. 2A. The cross-sectional shape is an isosceles triangle having an apex angle 32 of an obtuse angle. The cross-sectional shape of the strip rubber S extruded through the hole 31 has a shape close to the cross-sectional shape of the hole 31 as illustrated in FIG. 2B. However, portions corresponding to corner portions of the cross-sectional shape of the hole 31 are rounded. Portions corresponding to straight portions of the cross-sectional shape of the hole 31 are slightly curved outward of the cross-sectional shape. As a whole, the strip rubber S has a flat elongated shape as illustrated in FIG. 2C. One of the two surfaces of the strip rubber S is swelled out high at a widthwise center portion thereof and is provided with an apex portion 33. The strip rubber S gets thinner as it goes to both widthwise end sides. The apex portion 33 here is a portion passing through the vicinity of the apex angle 32 of the cross-sectional shape of the hole 31 at the time of extrusion. In the following explanation, the surface having the apex portion 33 formed thereon is referred to as a surface 34 on the apex portion side, and a surface opposite thereto is referred to as a back surface 35.

The cross-sectional shape of the hole 31 is not limited to that illustrated in FIG. 2A. What is essential is only that the strip rubber S extruded through the hole 31 has a flat elongated shape, and the widthwise center portion of one of the two surfaces is swelled more than that of the widthwise center portion of the other surface to form the apex portion. In this case, the widthwise both end portions of the strip rubber S is thinner than the center portion.

A cylinder 40 is provided above the extruder 3. The pressure bonding roller 4 is mounted at a distal end of a piston 41 formed integrally with the cylinder 40. The pressure bonding roller 4 is configured to be capable of rotating about a rotating shaft 42. When the pressure bonding roller 4 receives an external force in the circumferential direction, the pressure bonding roller 4 rotates in the direction in which an external force works. The pressure bonding roller 4 moves between a position above the extruder 3 and the position in the proximity of the drum 2 by an action of the cylinder 40. A height of the pressure bonding roller 4 in a state in which the pressure bonding roller 4 is in the proximity of the drum 2 corresponds to a height at which a lower portion thereof comes into contact with the strip rubber S moving forward from the extruder 3 horizontally. The pressure bonding roller 4 is in the proximity of the drum 2 to an extent that the strip rubber S can be pressed against the drum 2. In a state in which nothing exists between the pressure bonding roller 4 and the drum 2, a certain internal is formed between an outer peripheral surface of the pressure bonding roller 4 in the proximity of the drum 2 and an outer peripheral surface of the drum 2. The outer peripheral surface of the pressure bonding roller 4 may be in contact with the outer peripheral surface of the drum 2. Presence or absence and the magnitude of the pressure applied to the both surfaces in the case where the outer peripheral surface of the pressure bonding roller 4 and the outer peripheral surface of the drum 2 are in contact with each other are not limited.

The blowing apparatus 5 includes a main body 50 placed in the periphery or the like of the extruder 3, a blowing pipe 51 configured to allow passage of wind generated in the main body 50, and a port member 52 connected to a distal end of the blowing pipe 51. The blowing pipe 51 is formed of rubber, and is deformable. The port member 52 is a metallic tubular member. An end of both ends of the port member 52, which is an end opposite to the end connected to the blowing pipe 51, corresponds to a blowing port 53. The port member 52 is fixed to the piston 41. The blowing port 53 of the port member 52 is directed toward the end of the pressure bonding roller 4 on the extruder 3 side. The port member 52, being fixed to the piston 41, moves toward and away from the drum 2 integrally with the pressure bonding roller 4. The main body 50 needs only to be able to generate wind, and the structure thereof is not specifically limited. However, the main body 50 is preferably configured to be capable of controlling the temperature of the wind. In particular, the main body is preferably configured to be capable of controlling the temperature of the wind at a time point when outgoing from the blowing port 53 of the port member 52 to a range from 20 to 50° C.

(2) Method of Adhering Strip Rubber S

A method of adhering the strip rubber S to the drum 2 by using the strip rubber adhering apparatus 1, and molding the tire component will be described.

First of all, the extruder 3 starts to operate. The drum 2 starts to rotate. The piston 41 moves toward the drum 2, so that the pressure bonding roller 4 and the port member 52 of the blowing apparatus 5 moves forward toward the drum 2. Consequently, the pressure bonding roller 4 comes into the proximity of the drum 2.

Subsequently, the strip rubber S is pushed out from the extruder 3. The extruded strip rubber S has the shape as described above. The surface 34 on the apex portion side of the strip rubber S faces upward. The extruded strip rubber S moves forward toward the drum 2 in the horizontal direction.

When the strip rubber S reaches the drum 2, the strip rubber S gets caught by the drum 2 in the direction of rotation of the drum 2. As described above, since the drum 2 rotates upward from below when viewed from the extruder 3 side, the strip rubber S gets caught upward. At this time, a rotational force of the drum 2 is transmitted to the pressure bonding roller 4, and the pressure bonding roller 4 rotates in the direction symmetry with the direction of rotation of the drum 2. The strip rubber S caught between the pressure bonding roller 4 and the drum 2 is pressed against the drum 2 by the pressure bonding roller 4. In this manner, the strip rubber S is adhered to the outer peripheral surface of the drum 2. The surface of the strip rubber S to be pressed in contact with the pressure bonding roller 4 is the surface 34 on the apex portion side, and the surface adhered to the outer peripheral surface of the drum 2 is the back surface 35 of the strip rubber S. The strip rubber S maintains the shape having the apex portion 33 at the widthwise center of the surface 34 on the apex portion side even after having adhered to the drum 2.

While the strip rubber S is adhered by the pressure bonding roller 4, wind is supplied from the port member 52 of the blowing apparatus 5. The blowing port 53 is directed toward the end of the pressure bonding roller 4 on the extruder 3 side. This portion is a portion of the pressure bonding roller 4 before catching the strip rubber S. Therefore, the wind is directed simultaneously to the portion of the pressure bonding roller 4 before catching the strip rubber S and the surface 34 of the strip rubber S on the apex portion side before being adhered to the drum 2 by the pressure bonding roller 4. Therefore, the strip rubber S is cooled before being adhered to the drum 2 by the pressure bonding roller 4. The portion to be cooled is the surface 34 on the apex portion side of the strip rubber S. Here, as described above, the temperature of the wind coming out from the blowing port 53 is preferably within a range from 20 to 50° C. An injection pressure of the wind from the blowing port 53 needs not to be a pressure as high as being capable of separating the strip rubber S from the object. For example, the injection pressure may be on the order of 0.1 to 0.5 MPa, for example.

Figure 3:
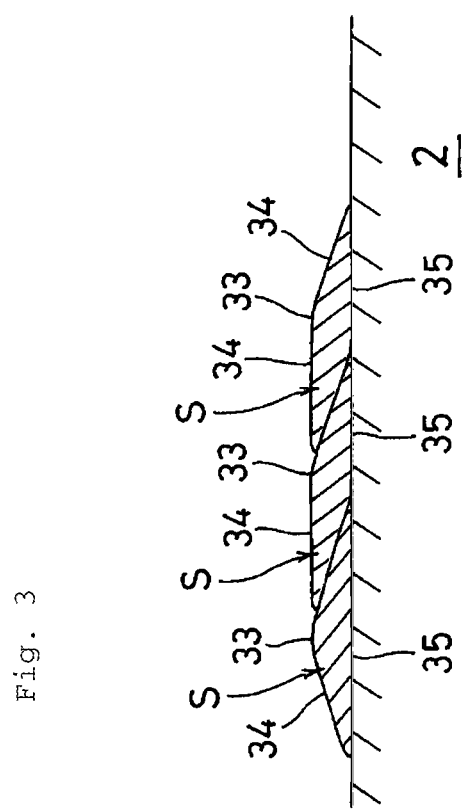
FIG. 3 is a cross-sectional view of the strip rubber S adhered onto a drum 2.

While the strip rubber S is adhered by the pressure bonding roller 4, the drum 2 moves in the direction of axis thereof. Therefore, the strip rubber S is wound around the drum 2 in a spiral manner. The strip rubber S is wound so as to avoid formation of a gap in the direction of axis of the drum 2. As illustrated in FIG. 3, the widthwise both end portions of the strip rubber S overlap with each other. Therefore, a thickness of a rubber layer formed by the strip rubber S wound therearound is widthwise uniform. As a matter of course, the extruder 3, the pressure bonding roller 4, and the port member 52 of the blowing apparatus 5 may be moved in the direction of axis of the drum 2 instead of the drum 2. In this case as well, the strip rubber S is wound around the drum 2 in a spiral manner.

When needed, another strip rubber S is adhered to the strip rubber S adhered to the drum 2 on ahead in an overlapped manner.

In the manner described above, when the strip rubber S having a certain length is adhered, the molding of the tire component is terminated.

The tire component completed in this manner is combined with other tire components and vulcanized. Accordingly, the tire is completed.

(3) Advantageous Effects

In the embodiment described above, when the strip rubber S is adhered to the drum 2 by the pressure bonding roller 4, the strip rubber S is cooled in the vicinity of the position of adhesion. Therefore, air is prevented from remaining in the completed rubber layer. Specifically, when the strip rubber S is adhered to the drum 2 or to the strip rubber S adhered to the drum 2 on ahead when it is still at a high temperature, the strip rubber S is cooled gradually, and is shrunk. Consequently, a level difference is generated between the widthwise end portions of the strip rubber S and the surface to which the strip rubber S is adhered. In addition, the surface 34 on the apex portion side of the strip rubber S is deformed. Accordingly, the air is embraced in the portions having a level difference or the deformed portions in the case where the strip rubber S is adhered to the widthwise both end portions of the shrunk strip rubber S, or in the case where the strip rubber S is further stacked over the surface 34 on the apex portion side of the deformed strip rubber S. As a result, air remains in the interior of a completed tire component. However, if the strip rubber S is in a cooled state when being adhered to the drum 2 by the pressure bonding roller 4, a probability of occurrence of such an event is not high.

Cooling of the strip rubber S in the vicinity of the position of adhesion impairs vulcanization of the rubber on the drum 2.

Since the strip rubber S shrinks in the vicinity of the position of adhesion to the drum 2, shrinkage of the strip rubber S after adhesion is already advanced. Therefore, shrinkage of the tire component after the completion is restrained. Consequently, a probability that the completed tire component is deformed or has a size below standard is avoided.

In the embodiment described above, the surface 34 on the apex portion side of the strip rubber S is cooled before being adhered to the drum 2 by the pressure bonding roller 4. Therefore, deformation of the strip rubber S at the time of pressure bonding may be prevented. In particular, collapse of the apex portion 33 of the strip rubber S is prevented and the widthwise both end portions of the strip rubber S are maintained to be thinner than the apex portion 33. Therefore, in the case where the strip rubber S is wound in a spiral manner while overlapping the widthwise both end portions one after another, the thickness of the rubber layer formed by the strip rubber S being wound becomes uniform in the widthwise direction. Since the temperature of the strip rubber S is low at a time point when the pressure bonding roller 4 abuts, deterioration of a surface of the pressure bonding roller 4 by abutment of the strip rubber S at a high temperature with the pressure bonding roller 4 is prevented.

However, part of the strip rubber S being cooled is only the surface 34 on the apex portion side, and the back surface 35 remains at a high temperature. Therefore, even when the surface to which the strip rubber S is adhered is irregular, the back surface 35 of the strip rubber S can be deformed so as to match the irregularity. Consequently, the back surface 35 of the strip rubber S can come into tight contact with the surface for adhesion, so that air is prevented from remaining on the back surface 35 side of the strip rubber S. In particular, in the case where a strip rubber S is adhered in an overlapped manner to a portion where the strip rubber S is already adhered and hence the surface has an irregular shape, if the temperature of the back surface 35 of the strip rubber S is high, the back surface 35 can be deformed so as to match the irregularity, so that a profound effect is expected.

If the temperature of the back surface 35 of the strip rubber S is high, the adhesiveness of the back surface 35 is high correspondingly, so that the strip rubber S can be brought into tight contact with the drum 2 or the strip rubber S adhered on ahead.

Furthermore, in the embodiment descried above, since the pressure bonding roller 4 is exposed to the wind supplied from the blowing apparatus 5 as well, the pressure bonding roller 4 is also cooled. Therefore, such an event that the temperature of the pressure bonding roller 4 is increased, and the surface 34 on the apex portion side of the strip rubber S cannot be cooled may be prevented. Also, the surface of the pressure bonding roller 4 can hardly deteriorated.

Here, suppose that the temperature of the wind supplied from the blowing apparatus 5 has a temperature of a range of 20 to 50° C., the surface 34 on the apex portion side of the strip rubber S can be cooled adequately. If the temperature of the wind is higher than 50° C. a case where the surface 34 on the apex portion side of the strip rubber S is not sufficiently cooled may occur. If the temperature of the wind is lower than 20° C., the temperature of the back surface 35 of the strip rubber S may be lowered.

If the injection pressure of the wind from the blowing port 53 is 0.1 to 0.5 MPa, the strip rubber S can be cooled without problem. Further specifically, if the injection pressure is higher than 0.1 MPa, the surface 34 on the apex portion side of the strip rubber S can be cooled sufficiently. However, if the injection pressure is higher than 0.5 MPa, a case where the back surface 35 of the strip rubber S is also cooled may occur. The strip rubber may be deformed with an injection pressure.

(4) Modification (4-1) Modification 1 of Arrangement of Port Member 52 of Blowing Apparatus 5

The position of the strip rubber S exposed to the wind is not limited to the position descried in the above-described embodiment. What is essential is that the position at a center of a range exposed to the wind is in the vicinity of the position where the strip rubber S is adhered to the drum 2. The position in the vicinity corresponds to a position between the extruder 3 to the position of adhesion of the strip rubber S with respect to the drum 2, on the surface of the drum 2, or on the strip rubber S adhered to the drum 2 within 10° from the position of adhesion of the strip rubber S with respect to the drum 2 in the direction of rotation of the drum 2.

Figure 4:
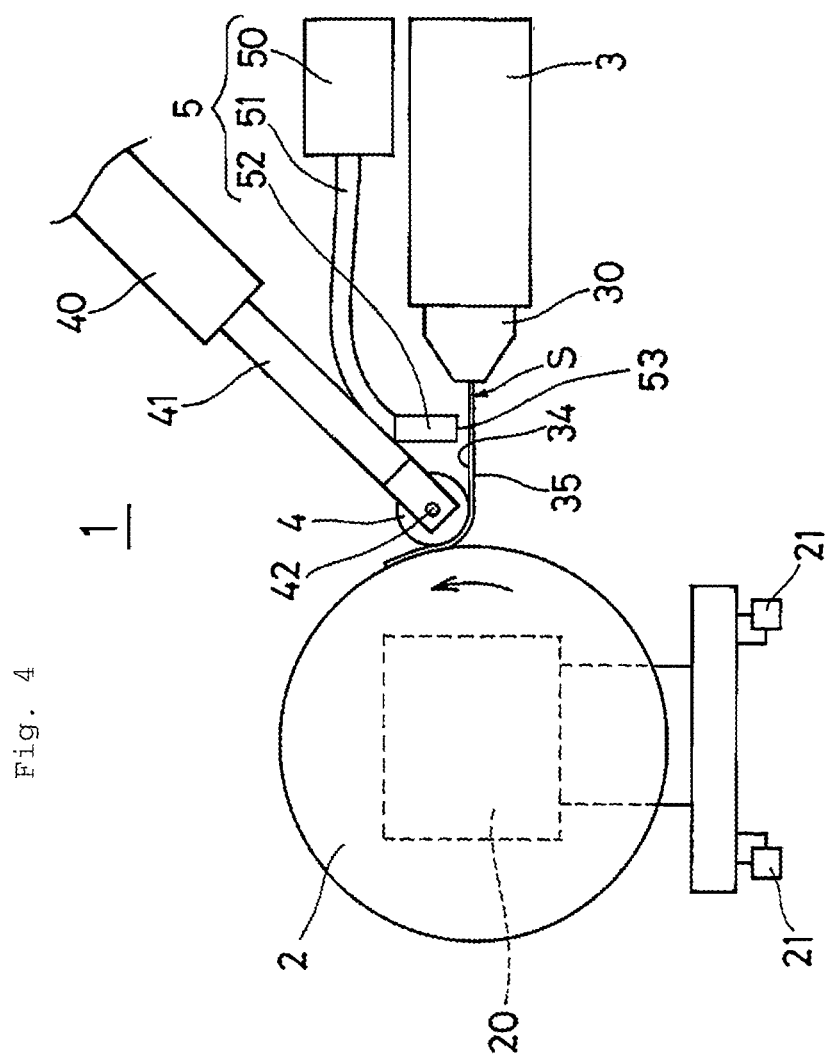
FIG. 4 is a front view of a modification of the strip rubber adhering apparatus 1 modified in arrangement of a port member 52 of a blowing apparatus 5.

FIG. 4 illustrates a modification of the arrangement of the port member 52. The port member 52 is provided above a portion between the cap 30 of the extruder 3 and the pressure bonding roller 4 in a state of being advanced toward the drum 2. The blowing port 53 of the port member 52 faces downward.

If the port member 52 is arranged in this manner, the surface 34 on the apex portion side of the strip rubber S is exposed to the wind between the cap 30 of the extruder 3 and the pressure bonding roller 4 in a state of being advanced toward the drum 2. Therefore, in the same manner as the case of the embodiment described above, the surface 34 on the apex portion side of the strip rubber S can be cooled, and hence the same effect as that of the above-described embodiment on the basis thereof is achieved.

(4-2) Modification 2 of Arrangement of Port Member 52 of Blowing Apparatus 5

Figure 5:
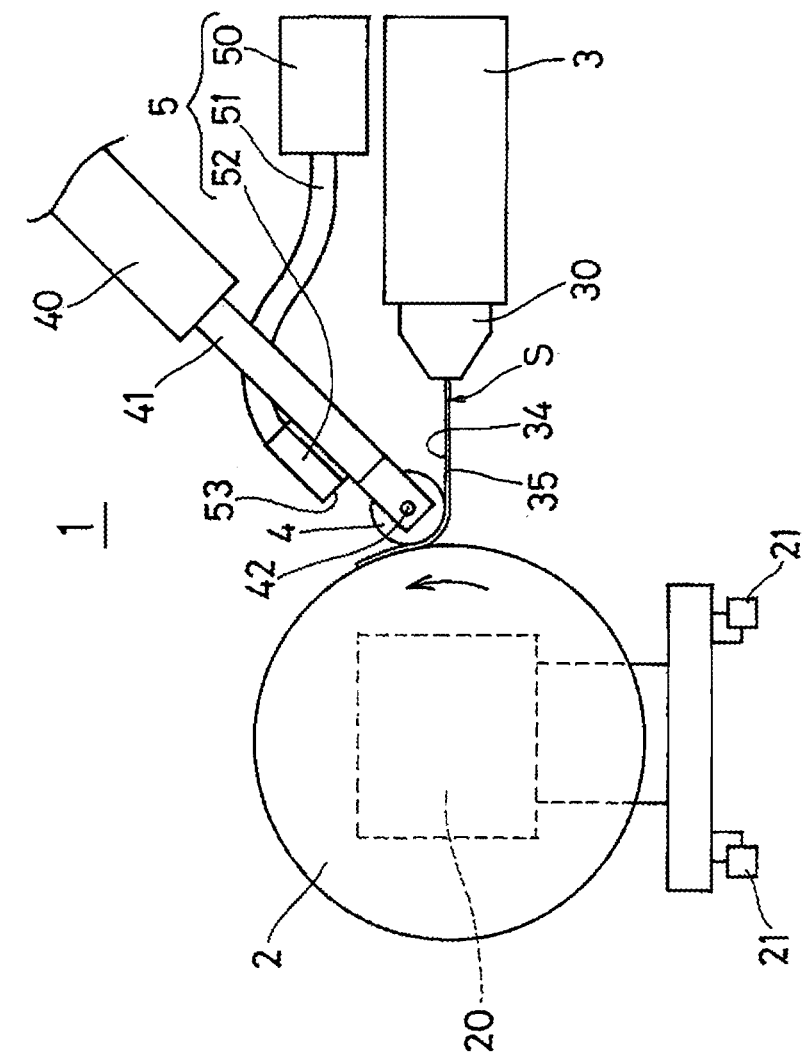
FIG. 5 is a front view of another modification of the strip rubber adhering apparatus 1 modified in arrangement of the port member 52 of the blowing apparatus 5.

FIG. 5 illustrates another modification of the arrangement of the port member 52. The port member 52 is provided above the pressure bonding roller 4 in a state of being advanced toward the drum 2. The blowing port 53 of the port member 52 is directed toward the outer peripheral surface of the drum 2, on side of the direction of rotation of the drum 2 with respect to the pressure bonding roller 4 in a state of being advanced toward the drum 2. The center position to which the wind from the blowing port 53 on the outer peripheral surface of the drum 2 is within 10° from the position where the strip rubber S is pressure bonded by the pressure bonding roller 4 in the direction of rotation of the drum 2.

If the port member 52 is arranged in this manner, the surface 34 of the strip rubber S on the apex portion side is exposed to the wind after being pressure bonded to the drum 2. Therefore, the strip rubber S is cooled and hence shrunk immediately after the pressure bonding on the drum 2. Therefore, there is no probability of acceleration of vulcanization of the strip rubber S on the drum 2. Shrinking of the rubber layer after the completion of the rubber layer may also be restrained. Furthermore, since the strip rubber S is adhered in the state of high temperature, even when the surface to which the strip rubber S is adhered is irregular, the back surface 35 of strip rubber S can be deformed so as to match the irregularity on the surface of adhesion.

(4-3) Modification of Position of Adhesion of Strip Rubber S

Figure 6:
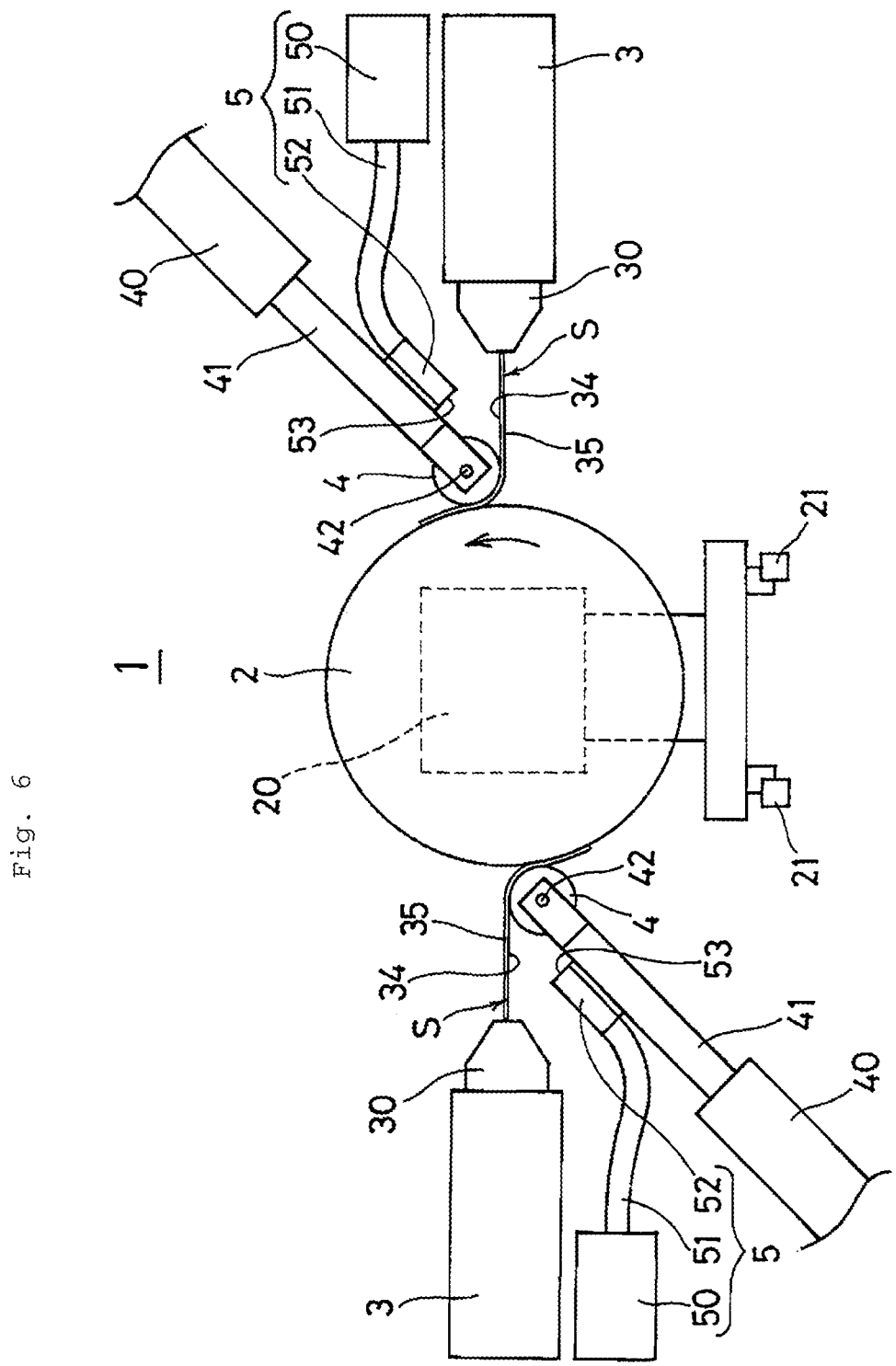
FIG. 6 is a front view of still another modification of the strip rubber adhering apparatus 1 modified in position of adhesion of the strip rubber S.

FIG. 6 illustrates a modification of the position of adhesion of the strip rubber S. In this modification, the extruder 3 the pressure bonding roller 4, and the blowing apparatus 5 are provided at a position on the drum 2 on the extruder 3 side and a position opposite thereto with the drum 2 interposed between. Adhesion of the strip rubber S of the above-described embodiment is performed on both sides of the drum 2.

According to the modification, adhesion of the strip rubber S is performed at two positions, adhesion can be terminated in a short time.

What is claimed is:

1. A strip rubber adhering method comprising:
   extruding strip rubber of a shape having an apex portion in cross section from an extruder and moving the strip rubber forward toward a rotating drum;
   pressing a surface of the strip rubber on the apex side toward the drum by a rotatable pressure bonding roller, adhering a surface of the strip rubber on the opposite side from the apex portion side to the drum, moving relatively the drum and the extruder with respect to each other in an axial direction of the drum, and adhering the strip rubber to the drum while winding the strip rubber in a spiral manner; and
   exposing the surface of the strip rubber on the apex portion side to wind supplied from a blowing apparatus and cooling the surface of the strip rubber on the apex portion side, wherein the exposing comprises:
   exposing the surface of the rubber strip to the wind in the vicinity of a position of adhesion of the strip rubber to the drum such that the wind impinges on a range of the strip before the range is brought into contact with the pressure roller and such that a center of the range exposed to the wind is between the extruder and a position where the strip rubber is pressure bonded by the pressure bonding roller, and
   exposing a portion of the surface of the strip rubber on the apex portion side before being adhered to the drum and a portion of the pressure bonding roller before catching the strip rubber to the wind supplied from the blowing apparatus simultaneously and cooling the portion of the surface of the strip rubber on the apex portion side before being adhered to the drum and the portion of the pressure bonding roller before catching the strip rubber simultaneously, wherein the surface on the opposite side from the apex portion is brought to the adhesion position at a high temperature which is hotter than that of the cooled apex portion side such that adhesion is facilitated.

2. The strip rubber adhering method according to claim 1, wherein a temperature of the wind supplied from the blowing apparatus ranges from 20 to 50° C.

* * * * *